(12) United States Patent
Goldring et al.

(10) Patent No.: US 9,843,156 B2
(45) Date of Patent: Dec. 12, 2017

(54) Q-SWITCHED FIBER LASER

(71) Applicant: Soreq Nuclear Research Center, Yavne (IL)

(72) Inventors: Sharone Goldring, Yavne (IL); Bruno Sfez, Jerusalem (IL)

(73) Assignee: Soreq Nuclear Research Center, Yavne (IL)

( * ) Notice: Subject to any disclaimer, the term of this patent is extended or adjusted under 35 U.S.C. 154(b) by 0 days.

(21) Appl. No.: 15/303,074

(22) PCT Filed: Apr. 13, 2015

(86) PCT No.: PCT/IB2015/052678
§ 371 (c)(1),
(2) Date: Oct. 10, 2016

(87) PCT Pub. No.: WO2015/159200
PCT Pub. Date: Oct. 22, 2015

(65) Prior Publication Data
US 2017/0063023 A1  Mar. 2, 2017

(51) Int. Cl.
*H01S 3/115* (2006.01)
*H01S 3/117* (2006.01)
*H01S 3/16* (2006.01)
*H01S 3/094* (2006.01)
*H01S 3/067* (2006.01)
*H01S 3/0941* (2006.01)
*H01S 3/106* (2006.01)
*H01S 3/139* (2006.01)

(52) U.S. Cl.
CPC ............ *H01S 3/117* (2013.01); *H01S 3/0675* (2013.01); *H01S 3/06716* (2013.01); *H01S 3/06754* (2013.01); *H01S 3/06791* (2013.01); *H01S 3/0941* (2013.01); *H01S 3/094003* (2013.01); *H01S 3/1618* (2013.01); *H01S 3/06729* (2013.01); *H01S 3/09415* (2013.01); *H01S 3/1067* (2013.01); *H01S 3/139* (2013.01)

(58) Field of Classification Search
CPC ............ H01S 3/06716; H01S 3/06791; H01S 3/0675; H01S 3/094015; H01S 3/094011
See application file for complete search history.

(56) References Cited

U.S. PATENT DOCUMENTS

| 7,876,794 | B2 * | 1/2011 | Kakui | ............... H01M 8/04186 372/10 |
| 2006/0104582 | A1 * | 5/2006 | Frampton | ............ B29C 47/0028 385/123 |
| 2007/0087252 | A1 * | 4/2007 | Kakui | ............... H01M 8/04186 372/10 |

FOREIGN PATENT DOCUMENTS

EP  0989440  3/2000

OTHER PUBLICATIONS

PCT Search and Written Opinion PCT/IB2015/052678, dated Oct. 16, 2015.
Berg Y et al, "Q-switching an all-fiber laser using acousto-optic null coupler", Applied Physics B: Lasers and Optics, Springer Berlin, Germany, vol. 111, No. 3, May 2013, pp. 425-428.

* cited by examiner

*Primary Examiner* — Tuan Nguyen
(74) *Attorney, Agent, or Firm* — Dekel Patent Ltd.; David Klein

(57) ABSTRACT

A fiber laser, null coupler acoustic Q-switch, fiber amplifier and feedback system is described for generation of high power laser pulses.

8 Claims, 4 Drawing Sheets

Q-SWITCHED FIBER LASER

CROSS-REFERENCE TO RELATED APPLICATIONS

This application is a national phase application of PCT patent application PCT/IB2015/052678, filed 13 Apr. 2015, which claims priority under 35 USC §119 to U.S. Provisional Patent Application, Ser. No. 61/978,912, filed 13 Apr. 2014, which are incorporated herein by reference.

FIELD OF THE INVENTION

The present invention relates generally to lasers, and particularly to a Q-switched fiber laser.

BACKGROUND OF THE INVENTION

Characteristic features of fiber lasers include high output beam quality, compact size, ease-of-use, and low running cost. Fiber lasers can generate either continuous-wave (CW) radiation or pulse radiation. Pulsed operation can be achieved via Q-switching techniques. Q-switched fiber lasers are preferred for applications such as micro-machining, marking, and scientific research due to their high peak power and excellent beam quality. Q-switching is achieved by inserting an optical modulator in the laser resonance cavity to control optical loss in the cavity. In particular, the modulator functions as an optical loss switch. Initially, cavity loss is kept on a high level (low Q factor state). Laser oscillation cannot occur at this initial period, but energy from a pump source accumulates in the gain medium. Subsequently, cavity loss is switched to a low loss level (high Q factor state), so that laser oscillation builds up quickly in the cavity and generates a high peak power laser pulse. When the laser cavity is switched between low Q and high Q by the optical modulator, sequenced laser pulses are produced.

SUMMARY OF THE INVENTION

The present invention seeks to provide an improved Q-switched fiber laser, as described more in detail hereinbelow.

One example is a Q-switched Yb-fiber laser based on traveling acoustic distortion. An induced acoustic distortion within a null fiber coupler (or similar configurations) is used to couple light as feedback for a laser resonator and extract a giant laser pulse. The acoustic pulse is generated by an acoustic transducer (e.g., piezo-electric actuator) attached to the fiber or by other means that can generate a traveling acoustic distortion within the coupling element (fiber null coupler).

A more detailed explanation of the general concept of operation of such a device is included in section A. Different types and possible configurations for the feedback loop associated with such a mode of operation are detailed in section B.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

The following is a summarized explanation of a Q-switching ytterbium fiber laser by inducing distortion upon a coupling device.

The Induced Acoustic Distortion

Generally, an acoustic distortion induces local-temporal change of the refractive index within the optical fiber coupler. This change causes light carried in a defined electro-magnetic mode or modes to stimulate other mode or modes which are then routed and used for the laser feedback.

The appropriate acoustic pulse shape is either predetermined according to the coupler's geometry, or dynamically optimized in order to achieve a single and most efficient laser pulse for each acoustic pulse. It is noted that among the possible acoustic pulse shapes, an oscillating form, which may be considered as a burst, is included.

Fiber Null Coupler

An extensive discussion of different fiber null couplers is found in the literature; see, for example, T. A. Birks, P. St. J. Russell, D. O. Culverhouse, S. G. Farwell & C. N. Pannell, "ACOUSTO-OPTICAL FREQUENCY SHIFTERS IN DUAL-CORE OPTICAL FIBRES", AFOSR 91-0387 Final Report, Optoelectronics Research Centre, University of Southampton, (1995). For use in the present invention, any fiber optical coupler that in the absence of an acoustic distortion routes all the input light into a defined terminal and only when an acoustic distortion is induced light is forced out of a different output terminal, is in principle appropriate. This will include the possibility to explicitly use a null coupler composed of or connected to polarization maintaining fibers for Q-switched operation of a linearly polarized fiber laser.

Gain Medium

A laser operation in a similar configuration has been demonstrated using an erbium-doped laser (see Y. Berg, S. Goldring, S. Pearl & A. Arie, "Q-switching an all-fiber laser using acousto-optic null coupler", App. Phys. B, 425-428, (2013)). The relatively long lifetime of the upper laser energy level and the relatively low gain makes erbium-doped material more suitable for slow switching mechanisms. However, in the present invention and in contrast to the prior art, by inducing a suitable acoustic deformation on a null coupler enough feedback for efficient Q-switching can be generated at short times, which are sufficiently short to allow efficient Q-switching of an ytterbium doped fiber laser as well as other rear-earth lasing materials.

Proper shaping of the acoustic distortion by closing a feedback loop ensures stable and optimal output laser pulses at different modes of operation, for example, at different repetition rates.

Laser Configuration

Figure 1:
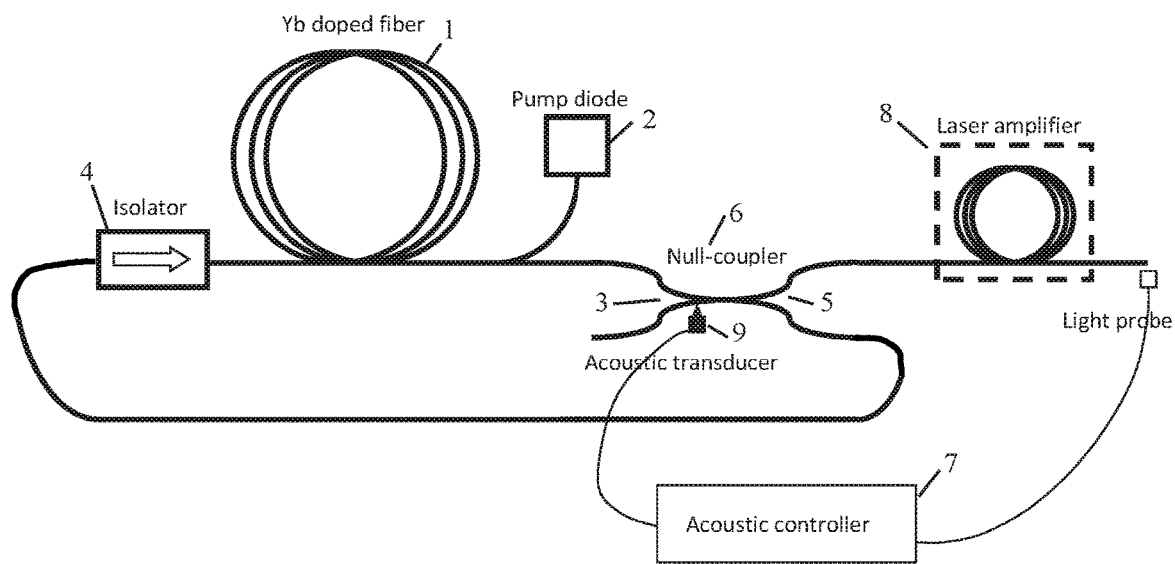
FIG. 1 is a simplified schematic illustration of an ytterbium fiber laser, null coupler acoustic Q-switch, fiber amplifier and a feedback system for generation of high power laser pulses, constructed and operative in accordance with a non-limiting embodiment of the invention.

FIG. 1 depicts a schematic layout of the laser system. An ytterbium-doped fiber 1 is pumped by a diode laser 2. One of the active fiber's ends is connected to a null coupler input terminal 3 while the other end is connected to an isolator 4 which in turn is connected to the adjacent output terminal 5 of the null coupler 6. In the absence of acoustic distortion, fluorescent light that originates in the pumped ytterbium fiber 1 is either absorbed by the isolator 4 or transmitted via the null coupler output terminal 5. In this situation no light feedback is generated and energy is stored in the ytterbium fiber 1 by high population inversion. When an acoustic distortion from an acoustic transducer 9 is imposed on the null coupler 6, some of the fluorescent light is routed from the output terminal 5 of the null coupler 6 to the adjacent terminal 3. This light is then fed-back into the ytterbium fiber 1 via the isolator 4 and extracts stored energy by stimulated emission. This cycle continues as long as the acoustic distortion activates light coupling in the null coupler 6 and energy is available in the active fiber. The number of cycles and the pulse shape and duration depends upon the gain and fiber characteristics as well as on the acoustic distortion characteristics. Optimization of the acoustic distortion may be achieved by constantly monitoring the laser output and dynamically changing the acoustic distortion's shape and intensity. A feed-back system may be used, including an acoustic controller 7, which samples and measures light from the null coupler 6. The electric signal is sent to the feed-back system that modifies the electric signal sent to the acoustic transducer 9 so as to optimize (maximize or minimize) the intensity or other properties of the light out of the null coupler 6. This device is particularly important if one wants to change the operating parameters such as the pulse repetition rate, or if the external parameters (such as the room temperature) are not constant. In order to achieve more energetic laser pulses, the output terminal of the null coupler may be directly connected to a laser amplifier 8.

Section A

Dynamically Controlled Reflective Element (DCRE)

One feature of the invention is to create a selective dynamic optical feedback or reflection back into an optical waveguide. Such an apparatus can be used as an effective output coupling mirror in a laser resonator or as an effective Q-switch element. Furthermore, if the feedback is based on a tunable long-period-grating (LPG) the effective reflectivity of the apparatus can be tuned with respect to wavelength and intensity.

Applications

The main applications of the apparatus may be divided into two categories: a. dynamic mirror and b. a Q-switch device. This division into categories is somewhat superficial and is made for the sake of clarity; any combination of the two is also possible.

a. Dynamic Mirror:

Optical devices such as lasers need a feedback mechanism in order to close a resonant amplification loop. Usually this feedback is achieved by placing a partially reflective mirror, namely, an output coupler as the output terminal of the laser resonator. In the present invention, the null coupler can be used as the output terminal of the laser resonator.

I. Dynamic reflectivity:

II. The optimal reflectivity of the output coupling mirror depends upon a large variety of parameters including the gain of the lasing material, the optical losses in the resonator and the tolerable intra-cavity intensity. Some of the parameters that dictate the criteria for optimal output mirror reflectivity are dynamic and may change depending on the pump power, thermal variations or other parameters that change during the laser operation. The dynamic mirror of the invention is in contrast with the prior art, which includes an output coupler from an optical waveguide system; in the prior art, a mirror with a constant reflectivity is placed as an output coupler with reflectivity chosen for best performance at certain working conditions.

III. One implementation of the innovation is to use the device as a dynamic output coupler. This will allow operation with an optimal effective output coupler matched constantly to any changing working condition.

IV. Dynamic wavelength selectivity:

V. For some applications it is desired to achieve tunable reflectivity not only in magnitude (ratio between the reflected and transmitted light), but also with respect to the optical wavelength. An example of application for such a device is a wavelength selective element in a tunable laser cavity.

VI. Several approaches to achieve such tunability were proposed and demonstrated in the prior art. The different approaches include free-space grating assisted wavelength selectivity [G. Wilson, C. Chen, P. Gooding and J. Ford, "Spectral passband filter with independently variable center wavelength and bandwidth", IEEE photn. tech. lett. Vol. 18, No. 15, 1660-1662, (2006), and D. Huang, W. Liu and C. C. Yang, "Q-Switched all-fiber laser with an acoustically modulated fiber attenuator", IEEE photn. tech. lett. Vol. 12, No. 9, 1153-1155, (2006)], manipulation of the reflection from fiber Bragg gratings [H. G. Limberger, N. H. Ky, D. M. Costantini, R. P. Salathe, C. A. P. Muller, and G. R. Fox, "Efficient miniature fiber-optic tunable filter based on intacore bragg grating and electrically resistive coating", IEEE photn. tech. lett. Vol. 10, No. 3, 361-363, (1998)], selective resonant wavelengths by interferometry and an optically induced grating in an intra-cavity saturable absorber [S. A. Haystad, B. Fischer, A. E. Willner, M. G. Wickham, "Dynamic fiber loop-mirror-filter (LMF) based on pump-induced saturable gain or absorber gratings", Optical fiber communication conference, 1999]. The implementation of the invention as a tunable wavelength selective mirror is different from all prior art techniques. As long as the induced disturbance in the apparatus is wavelength selective (as is the case for acoustic induced long period grating, for example), the reflectivity of the device will respond accordingly, and thus dynamic wavelength selection can be achieved.

b. Q-Switch Device:

For some applications it is desired to operate a laser in a Q-switch mode. Most methods for Q-switching a laser are based on inducing losses in the laser cavity and thus lowering the quality factor of the resonator and bringing the laser below its threshold. Electrically induced birefringence such as the case in a Pockels cell and acousto-optic induced grating deflector are commonly used as "free spaces" Q-switches. All fiber Q-switching is much less abundant than free-space Q-switching, nevertheless, all fiber Q-switching was also demonstrated. Such switching was achieved by inducing acoustic LPG in a fiber laser cavity [D. Zalvidea, N. A. Russo, R. Duchowicz, M. Delgado-Pinar, A. Diez, J. L. Cruz, M. V. Andres, "High-repetition rate acoustic-induced Q-switched all-fiber laser", Opt. Comm. 244, 315-319, (2005)], de-phasing a Bragg mirror by acoustically induced LPG [D. Huang et al., ibid], induced birefringence by tension on a fiber with a polarization dependent filter [J. Geng, Q. Wang, J. Smith, T. Luo, F. Amzajerdian, and S. Jiang, "All-fiber Q-switched single-frequency Tm-doped laser near 2 µm", Opt. Lett. Vol. 34, No. 23, 3713-3715, (2009)], as well as a number of configurations, which utilize passive saturate able absorbers in a fiber laser cavity. Generally, it becomes increasingly difficult to achieve hold-off of a laser as the gain of the lasing medium is increased. In optical waveguides such as fiber lasers, very high gain is commonly reached and lasing can begin with a very low feedback from the output mirror. For such cases, very high losses have to be induced in order to obtain hold-off. The present invention as discussed above is suitable to be used as an output coupler. In the absence of interference, the laser cavity may have an effective output coupler with zero reflection, thus allowing for population inversion and maximum hold-off. Once interference is induced on the device, the effective reflectivity rises, the quality factor of the resonator is increased and a laser pulse may be created.

Optical modes of a perfect waveguide are orthogonal and by virtue of their definition do not exchange power between them. Exchange of power between modes can however be achieved by virtue of induced interference or perturbation to the waveguide. An example of such a phenomena is a long period grating (LPG) written on a single mode fiber [K. Okamoto, "Fundamentals of optical waveguides", Academic Press, London 2006]. In such a system, certain modes of certain wavelength are coupled to other so-called cladding modes and power from the single mode fiber core is transmitted to the cladding without changing the direction of propagation. For the sake of clarity, the original propagating mode will be called the "original mode" and the mode to which power was coupled via the perturbation will be referred to as the "coupled mode".

Figure 2:
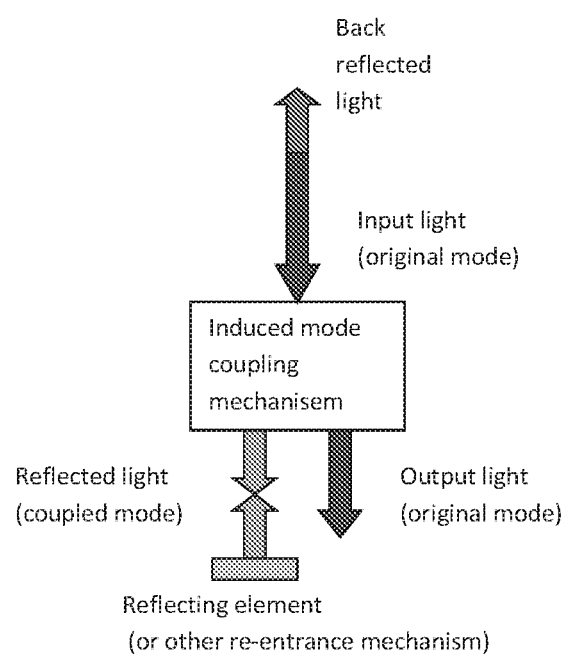
FIG. 2 is a simplified schematic illustration of a non-limiting embodiment of the present invention, based on the creation of selective reflection in such a way that the original mode is almost not affected at all, while the coupled mode is reflected back.

Following the example of LPG, but without loss of generality, the induced interference can be dynamically controlled such as the case with acoustically induced LPG [D. Huang et al., ibid]. A non-limiting innovation of the present invention is based on the creation of selective reflection in such a way that the original mode is almost not affected at all, while the coupled mode is reflected back (FIG. 2). When the coupled mode is back reflected it is coupled back to the original mode via the same perturbation, only this time the original mode propagates in an opposite direction to its input direction. A device of the type discussed above is in fact an effective mirror since at the end of the process, light that has propagated in the original mode in one direction will propagate in the opposite direction. With respect to the above example, back reflection of the coupled mode can be achieved by a reflector fabricated only in the cladding area of the fiber without noticeable interaction with the core mode.

The innovation is general and applies to any induced interaction between modes in a waveguide in such a way that at the coupled mode is forced to return and create an effective reflection.

Another example of implementation of the innovation is discussed below.

In some configurations, when two optical waveguides are brought together in close proximity they may exchange the guided light only when some external interference is induced (this in essence is the same as the above example since each waveguide is coupled to a different set of modes in the combined system). An example of such a system was demonstrated with a so-called fiber "null coupler" [T. A. Briks, S. G. Farwell, P. St. J. Russell, and C. N. Pannell, "Four-port fiber frequency shifter with a null taper coupler", Opt. Lett. Vol. 19. No. 23, 1964-1966, (1994)]. In this example light was selectively coupled between the terminals of the null coupler if and only if an acoustic LPG was induced in the coupler. Implementation of the innovation in such a system can be achieved if the terminals of the waveguide that accepts the coupled mode are made to reflect back the coupled mode. Here again, the back reflected coupled mode will re-couple to the original mode and waveguide but with an opposite direction of propagation.

Section B
Physical Concept of the Proposed Mirror or Switch

One feature of the invention is to create a selective dynamic optical feedback or reflection back into an optical waveguide. Such an apparatus can be used as an effective output coupling mirror in a laser resonator or as an effective Q-switch element. Furthermore, if the feedback is based on a tunable long-period-grating (LPG) the effective reflectivity of the apparatuses can be tuned with respect to wavelength and intensity.

FIGS. 3-6 illustrate schematically and without loss of generality, four different configurations that demonstrate possible implementations of the technique in a fiber optic waveguides. Such or similar configurations can be implemented in other optical waveguide systems as well.

Figure 3:
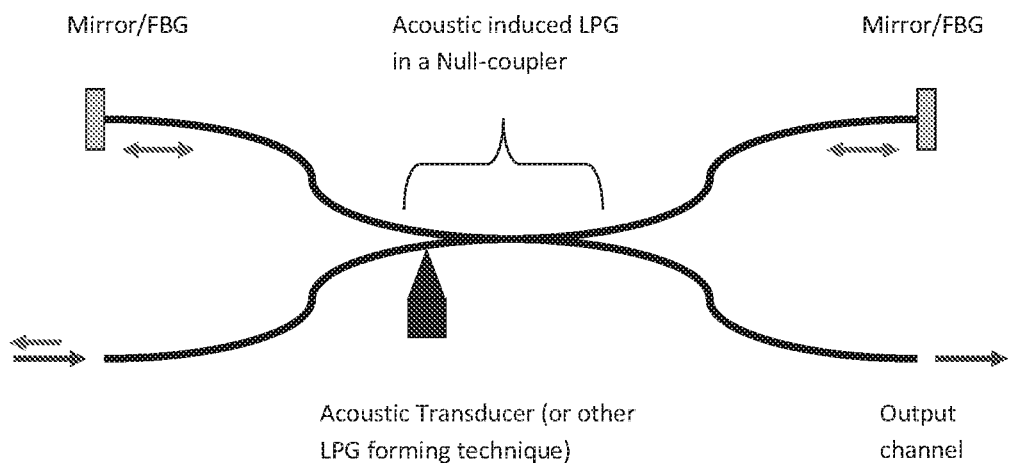
FIG. 3 is a simplified schematic drawing of a dynamic mirror/switch based on a null coupler, acoustically induced LPG (long period grating) and reflecting elements on both ends of the feedback channel, in accordance with a non-limiting embodiment of the invention.

Example 1 (FIG. 3): Dynamic Mirror or Switch Based on a Null Coupler, Acoustically Induced LPG and a Reflecting Elements FIG. 3 depicts an example of a dynamic mirror or switch and demonstrates one configuration of utilizing the proposed technique. This scheme is based on the so called "null coupler"[1], acoustically induced LPG and a reflecting section. A null coupler is a waveguide configuration with two (or more) channels. In the absence of distortions, there is no crosstalk between the channels. This means that light that is injected into any one channel will exit at the end of the same channel and will not be transmitted to any of the other channels. When a distortion such as an acoustic LPG is induced, light may be coupled from one channel to another. If mirrors or other means of reflection are incorporated at the ends of a receiving channel, electromagnetic field will be recoupled back into the input channel thereby creating feedback. Since the coupling efficiency per wavelength between the channels depends upon the properties of the induced LPG, by changing the properties of the LPG (i.e. amplitude and period), the feedback intensity as a function of wavelength can be dynamically controlled.

T. A. Briks, S. G. Farwell, P. St. J. Russell, and C. N. Pannell, "Four-port fiber frequency shifter with a null taper coupler", Opt. Lett. Vol. 19. No. 23, 1964-1966, (1994).

Figure 4:
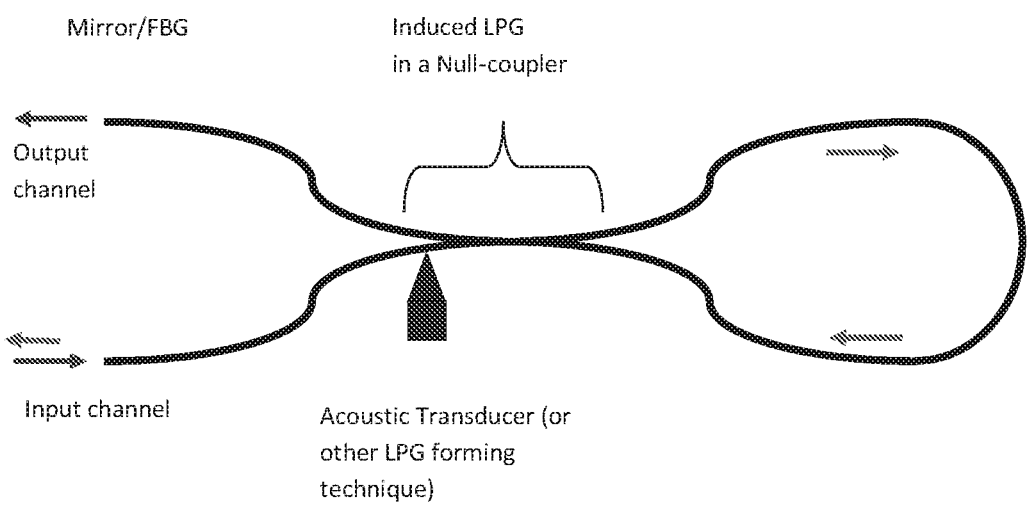
FIG. 4 is a simplified schematic drawing of a dynamic mirror/switch based on a null coupler, acoustically induced LPG and a feedback loop, in accordance with a non-limiting embodiment of the invention.

Example 2 (FIG. 4): Dynamic Mirror or Switch Based on a Null Coupler, Acoustically Induced LPG and a Feedback Loop FIG. 4 depicts an example of a dynamic mirror or switch and demonstrates another configuration of utilizing the proposed technique. It is conceptually similar to the scheme described in example 1 but differs in that the output of one channel of the null coupler is connected to the input of the other channel. In the absence of induced deformations (such as LPG), the channels do not interact so that light that is injected into the input end of one channel exits through the output end of the second channel and no feedback is achieved. As the acoustic LPG is induced, the two channels begin to exchange power so that part of the light returns back into the input channel as a feedback. As in the first example, dynamic intensity and wavelength selectivity can be achieved by controlling the characteristics of the induced LPG.

Figure 5:
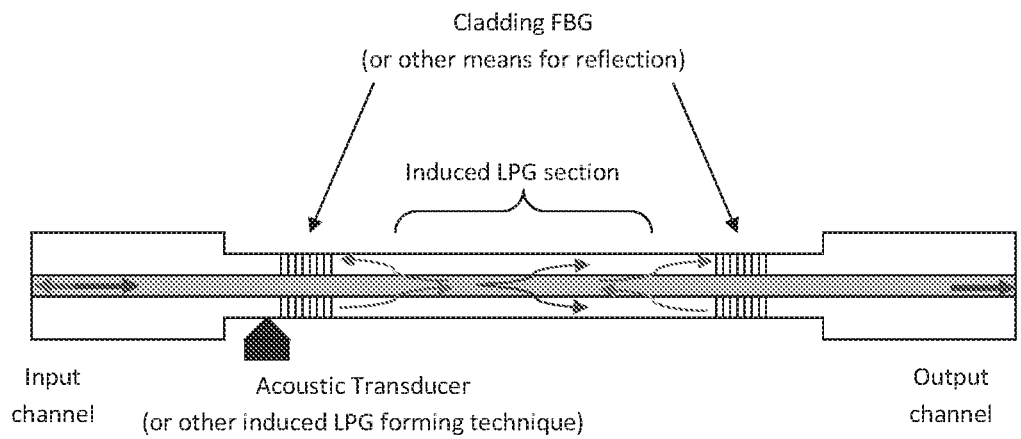
FIG. 5 is a simplified schematic drawing of a dynamic mirror/switch based on an induced LPG-assisted interaction between core and cladding modes and a Bragg reflector, in accordance with a non-limiting embodiment of the invention.

Example 3 (FIG. 5): Dynamic Mirror or Switch Based on Induced LPG-Assisted Interaction Between Core and Cladding Modes and a Bragg Reflector FIG. 5 depicts a schematic drawing of a dynamic mirror or switch based on induced LPG-assisted interaction between core and cladding modes and a Bragg reflector.

In the absence of LPG, light guided in the waveguide's core is transmitted without back reflections. When a proper LPG is induced (acoustically or in any other method), light from the core mode is coupled into a cladding mode. The cladding mode is trapped between two reflecting Bragg mirrors written in the fiber cladding. The cladding mode is then coupled back to core mode via the LPG, resulting in a feedback mechanism. Similarly to the previous examples, for each waveguide the induced LPG may be dynamically controlled so that the feedback's intensity and wavelength dependency may be temporally manipulated.

Figure 6:
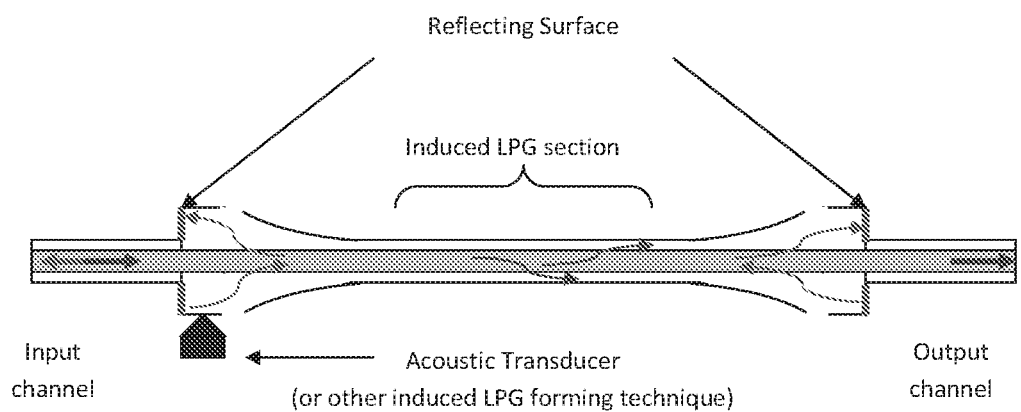
FIG. 6 is a simplified schematic drawing of a dynamic mirror/switch based on induced LPG-assisted interaction between core and cladding modes and a reflecting surface, in accordance with a non-limiting embodiment of the invention.

Example 4 (FIG. 6): Dynamic Mirror or Switch Based on Induced LPG-Assisted Interaction Between Core and Cladding Modes and a Reflecting Surface Example 4 which is depicted in FIG. 6 is essentially the same as the scheme discussed in example 3. Here, the Bragg mirrors are replaced with reflecting surfaces.

This or similar configurations may be advantageous over the configuration discussed in example 3 in that such a reflecting surface may be more appropriate for broad optical spectrum opposing the a Bragg reflector which generally has a narrow spectral responsivity.

What is claimed is:

1. A system characterized by: an active fiber pumped by a diode laser, one end of said active fiber being connected to an input terminal of a null coupler and another end of said active fiber being connected to an isolator which is connected to an output terminal of said null coupler, wherein an acoustic distortion from an acoustic transducer is imposed on said null coupler which causes light originating from said active fiber pumped by the laser to be routed from the output terminal of the null coupler to the input terminal, wherein said light is then fed-back into said active fiber in a feedback channel via the isolator, and wherein the null coupler has a refractive index and the acoustic distortion induces local-temporal change of the refractive index, further comprising a feed-back system comprising an acoustic controller operative to generate an electric signal based on sampling and measuring light output from said null coupler, wherein the electric signal is sent to said acoustic transducer to modify a property of the light out of said null coupler and comprising reflecting elements on both ends of the feedback channel.

2. The system according to claim 1, further comprising a feed-back system comprising an acoustic controller operative to generate an electric signal based on sampling and measuring light from said null coupler, wherein the electric signal is sent to said acoustic transducer to modify a property of the light out of said null coupler.

3. The system according to claim 1, wherein the light fed-back into said active fiber via the isolator extracts stored energy by stimulated emission.

4. The system according to claim 1, wherein the output terminal of the null coupler is directly connected to a laser amplifier.

5. The system according to claim 1, wherein the acoustic distortion is zero, and light that originates in the active fiber is either absorbed by the isolator or transmitted via the output terminal of the null coupler.

6. The system according to claim 1, wherein said active fiber comprises an ytterbium-doped fiber.

7. The system according to claim 1, wherein said null coupler comprises an output terminal of a laser resonator.

8. The system according to claim 1, wherein the acoustic distortion comprises an acoustic long-period-grating (LPG) distortion.

* * * * *